(12) United States Patent
Ganis et al.

(10) Patent No.: US 10,526,075 B2
(45) Date of Patent: Jan. 7, 2020

(54) LANDING GEAR ARRANGEMENT

(71) Applicant: Goodrich Corporation, Charlotte, NC (US)

(72) Inventors: Rony Giovanni Ganis, Oakville (CA); James Bernard, London (GB)

(73) Assignee: Goodrich Corporation, Charlotte, NC (US)

( * ) Notice: Subject to any disclaimer, the term of this patent is extended or adjusted under 35 U.S.C. 154(b) by 281 days.

(21) Appl. No.: 15/643,283

(22) Filed: Jul. 6, 2017

(65) Prior Publication Data
US 2018/0016001 A1 Jan. 18, 2018

(30) Foreign Application Priority Data

Jul. 12, 2016 (EP) .................................... 16179008

(51) Int. Cl.
B64C 25/42 (2006.01)
B64C 25/34 (2006.01)

(52) U.S. Cl.
CPC .............. B64C 25/42 (2013.01); B64C 25/34 (2013.01)

(58) Field of Classification Search
CPC .......... B64C 25/36; B64C 25/42; B64C 25/46
See application file for complete search history.

(56) References Cited

U.S. PATENT DOCUMENTS

| 2,471,956 A | 5/1949 | Holl | |
| 2,533,607 A * | 12/1950 | Neilson | B64C 25/44 188/206 R |
| 4,043,607 A * | 8/1977 | Signorelli | B60T 8/1703 188/181 T |
| 5,806,794 A | 9/1998 | Hrusch | |
| 5,944,147 A | 8/1999 | Berwanger | |
| 6,065,719 A | 5/2000 | Ralph | |
| 6,149,100 A | 11/2000 | Ralph | |

(Continued)

FOREIGN PATENT DOCUMENTS

EP 0099319 1/1984
EP 2993129 3/2016

(Continued)

OTHER PUBLICATIONS

Extended European Search Report dated Jan. 2, 2017 in European Application No. 16179008.4.

Primary Examiner — Brian M O'Hara
(74) Attorney, Agent, or Firm — Snell & Wilmer, L.L.P.

(57) ABSTRACT

An arrangement for landing gear comprises a piston, a bogie beam and forward and rear brake rods. The piston has an attachment portion with a pivot connection for the bogie beam at its lower end. The bogie beam is mounted to the attachment portion at the pivot connection. The bogie beam supports forward and rear brake assemblies on forward and rear sides of the piston. The forward brake rod is connected to the forward brake assembly at a location for acting under tension during braking and the rear brake rod is connected to the rear brake assembly at a location for acting under tension during braking. The rear end of the forward brake rod is connected to the attachment portion forward of the pivot connection of the bogie beam, and a forward end of the rear brake rod is connected to the attachment portion.

13 Claims, 2 Drawing Sheets

(56) References Cited

U.S. PATENT DOCUMENTS

| | | | | |
|---|---|---|---|---|
| 2007/0158496 A1* | 7/2007 | Yourkowski | ............ | B64C 25/34 244/102 R |
| 2012/0256050 A1 | 10/2012 | Hilliard | | |
| 2014/0084108 A1* | 3/2014 | Goodburn | ............... | B64C 25/34 244/100 R |
| 2016/0107747 A1 | 4/2016 | Sexton | | |
| 2016/0185453 A1* | 6/2016 | Hilliard | .................. | B64C 25/42 244/100 R |

FOREIGN PATENT DOCUMENTS

| | | |
|---|---|---|
| GB | 2493675 | 2/2013 |
| WO | 2006094145 | 9/2006 |

* cited by examiner

LANDING GEAR ARRANGEMENT

CROSS-REFERENCE TO RELATED APPLICATIONS

This application claims priority to and the benefit of European Application No. 16179008.4 filed Jul. 12, 2016 and entitled LANDING GEAR ARRANGEMENT, which is hereby incorporated by reference in its entirety.

TECHNICAL AREA

The present disclosure relates to a landing gear arrangement, in particular an arrangement of brake rods to react torque from a brake system on a landing gear bogie.

BACKGROUND

It is known in the art, such as in U.S. Pat. No. 5,806,794 and US 2016/0107747 A1 for aircraft landing gear to comprise a number of bogies, each connected to an attachment portion of a shock strut's piston (often referred to as the piston fork), that retract during flight. The aircraft bogies comprise at least two wheels connected to one another by a bogie beam, in a balanced fashion whereby the shock strut is arranged in a central position with at least one wheel behind and at least one wheel in front of the shock strut when viewed in the direction of travel.

As illustrated in U.S. Pat. No. 5,806,794 and US 2012/0256050, a horizontal brake rod or pair of brake rods may connect at a central point along the bogie to a base of the attachment portion or piston fork which protrudes below the bogie beam. The brake assemblies are usually arranged to "float" around the wheel axles and the brake rod (or rods) reacts torque on the brake assemblies under braking conditions of the aircraft.

In these known arrangements, the brake rod, at least when the landing gear is deployed, is offset vertically below the axes of rotation of the aircraft wheels. When the brakes of the aircraft are applied, the brake rod experiences a tensile force from the rear wheel since the torque on the rear brake assembly is pulling away from the brake rod at the point of contact, and a compressive force from the forward wheel, as the torque on the forward brake assembly at that point is pushing towards the brake rod.

As the brake rod will have portions acting in tension and compression, the portion of the brake rod in compression must be made strong enough to resist buckling. This may mean the brake rod is sized to meet the expected loads of the forward portion of the brake rod which is subjected to compressive forces, leading to overcompensation in terms of size and weight for the rear portion of the brake rod which is subjected to tensile forces.

US 2014/0084108 A1 discloses a possible means for overcoming this problem. The forward end of the brake rod is attached to the top of the forward brake assembly and a rear end is connected to the bottom of a rear or following brake assembly. As a result, the brake rod extends at an angle, sloping downwards from the front to the rear, such that both the forward and rear portions of the brake rod experience a tensile force during braking.

The brake rod may be a single rod with forward and rear brake portions, or may comprises separate forward and rear rods. In all cases, the brake rod which is attached to the top of the forward brake assembly has a central connection point (where central is with reference to a central portion along the bogie beam) to react the opposing tensile forces into the bogie beam or an axle thereof and to stabilise the position of the brake assemblies.

Since both portions of the brake rod will experience a tensile force during braking, the brake rod can be made more slender, reducing weight in the landing gear despite the additional length of the forward brake rod.

Although the above provides a means for reducing the size of the brake rod, the attachment positions on the bogie beam or axle can experience high levels of shear, if for any reason the tensile forces are not balanced (e.g. in the event of a brake failure). Accordingly, to accommodate the potential shear loads, the bogie beam may need to be made bigger and stronger and so some of the weight savings may be diminished.

It is desirable to reduce landing gear weight further, for example, where possible by improving aircraft design so that composite parts can replace the current metal sections. The present disclosure addresses at least some of the above problems.

SUMMARY OF THE DISCLOSURE

According to a first aspect of the disclosure, there is provided an arrangement for landing gear comprising: a piston having an attachment portion with a pivot connection for a bogie beam at a lower end; a bogie beam mounted to the attachment portion at the pivot connection, the bogie beam supporting forward and rear brake assemblies on forward and rear sides of the piston respectively; a forward brake rod connected to the forward brake assembly at a location for acting under tension during braking; and a rear brake rod connected to the rear brake assembly at a location for acting under tension during braking; characterised in that a rear end of the forward brake rod is connected to the attachment portion forward of the pivot connection of the bogie beam, and a forward end of the rear brake rod is connected to the attachment portion, at a position rearward of the pivot connection.

The forward brake rod may have been formed of a fibre composite material and may comprise fibres placed with an axial orientation (within ±25° of an axial direction of the forward brake rod). The axially orientated fibres may follow a helical path inclined at an angle of 5° or more, e.g., between 8 and 15°, to an axial direction of the forward brake rod.

The rear brake rod may have been formed of a fibre composite material and may comprise fibres placed with an axial orientation (within ±25° of an axial direction of the rear brake rod). The axially orientated fibres may follow a helical path inclined at an angle of 5° or more, e.g., between 8 and 15°, to an axial direction of the rear brake rod.

The axially orientated fibres of the forward/rear brake rod may represent more than 40% of the fibres making up the brake rod.

The axially orientated fibres may comprise continuous fibres, in particular continuous carbon fibres, extending from one end of the brake rod to the other.

The forward brake rod may connect to the forward brake assembly at a position above an axis of rotation for the forward brake assembly.

The forward brake rod may connect to the forward brake assembly at a position substantially at the top of the forward brake assembly, e.g., within ±45° of a vertical extending upwardly from the axis of rotation for the forward brake assembly. Optionally it may connect at a position within ±15° of a vertical extending upwardly from the axis of rotation for the forward brake assembly.

The rear brake rod may connect to the rear brake assembly at a position below an axis of rotation for the rear brake assembly.

The rear brake rod connects to the rear brake assembly at a position substantially at the bottom of the rear brake assembly, e.g., within ±45° of a vertical extending downwardly from the axis of rotation for the rear brake assembly. Optionally it may connect at a position within ±15° of a vertical extending downwardly from the axis of rotation for the rear brake assembly.

The forward brake rod and the rear brake rod may connect to a base portion of the attachment portion protruding below the bogie beam.

The forward brake rod may connect to an upper portion of the attachment portion (e.g., a region positioned above the pivot connection of the bogie beam) and the rear brake rod may connect to a base portion of the attachment portion (e.g., a region positioned below the pivot connection of the bogie beam).

The forward brake rod may connect to a forward facing surface of the attachment portion and the rear brake rod may connect to a rear facing surface of the attachment portion.

The brake rods may connect to lugs on the attachment portion.

The bogie beam may support two, three, four, six or eight wheels.

According to a second aspect of the disclosure, there is provided a method of reacting torque from forward and rear brake assemblies on a landing gear bogie beam via forward and rear brake rods, the method comprising: reacting torque from the braking assemblies as tension along the forward and rear brake rods into an attachment portion of a piston, the attachment portion having a pivot connection for mounting the bogie beam which supports the brake assemblies; the method being characterised in that a rear end of the forward brake rod reacts the torque from the forward brake assembly into the attachment portion forward of the pivot connection with the bogie beam as a tensile force under braking conditions, and in that a forward end of the rear brake rod reacts the torque from the rear brake assembly into the attachment portion at a position to a rear of the pivot connection as a tensile force under braking conditions.

The method may comprise using a forward brake rod formed from a fibre composite material having axially orientated fibres (within ±25° of an axial direction of the forward brake rod) to transmit tensile forces along the forward brake rod.

The method may comprise using a rear brake rod formed from a fibre composite material having axially orientated fibres (within ±25° of an axial direction of the rear brake rod) to transmit tensile forces along the rear brake rod.

The method may comprise connecting a forward end of the forward brake rod to the forward brake assembly at a position above an axis of rotation for the forward brake assembly, and connecting a rear end of the forward brake rod to the attachment portion at a position above the pivot connection for the bogie beam.

BRIEF DESCRIPTION OF THE FIGURES

Various embodiments of the disclosure will now be described with reference to the following description and drawings by way of example only, and with reference to certain figures, wherein.

DETAILED DESCRIPTION

Current conventional multi-axle main landing gear configurations typically react brake torque (during landing) back to the structure, most often to the lower piston fork, either directly via shear pins (e.g., center axle brakes on 3 axle/6 wheel bogies) or indirectly via brake rods for the farthest axles (e.g., usually the fore and aft axles). The piston fork is the part of the landing gear at the base of the piston which extends to a bogie beam to provide an attachment portion for the bogie beam (herein referred to also as "attachment portion"). The brake rods act as structural members that transfer the resulting brake torques into simple tensile (aft brake rod) or compressive loads (forward brake rod) into the piston fork under braking conditions. Most commonly these brake rod connections are placed at the bottom of the piston fork generally being parallel to the bogie beam. This arrangement is efficient structurally for the aft brake rod (tensile loads) but is not so efficient for the forward brake rod (compressive loads).

Figure 1:
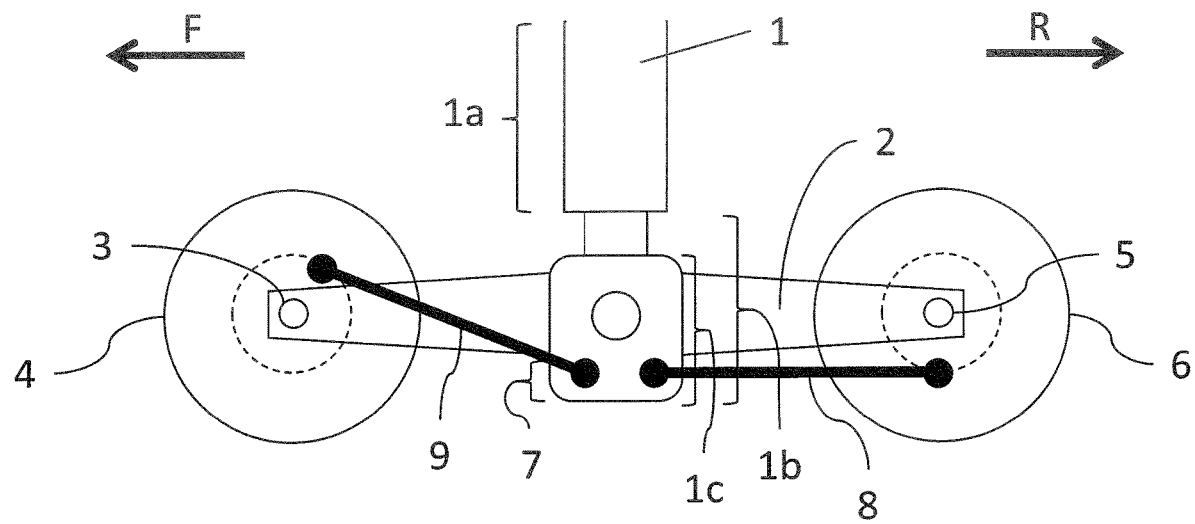
FIG. 1 shows an arrangement for aircraft main landing gear according to a first embodiment of the present disclosure.

In a main landing gear according to a first embodiment of the disclosure, as shown in FIG. 1, a shock strut 1 connects generally orthogonally to a central portion of a bogie beam 2. Connected to one end 3 of the bogie beam 2 is an axle of a forward wheel 4 and connected to the other end 5 of the bogie beam 2 is an axle of a rear wheel 6. The wheels 4, 6 may be single wheels (e.g., two wheels per bogie beam) or wheels arranged in pairs (e.g., four wheels per bogie beam) or other multiples (e.g., six, eight, etc.,) on a bogie beam 2.

The words "forward" and "rear" in describing the respective wheels 4, 6 refers to their relative position compared to an aircraft and in particular, compared to a forward direction of travel of the aircraft. Arrows labelled F and R in the Figures correspond to the forward and rearward directions of the aircraft. Similar considerations apply where the Willis "fore" and "aft" are used. References to "braking" herein are to be interpreted as references to braking during landing of the aircraft.

The shock strut 1 comprises a cylinder 1a and a piston 1b having an attachment portion 1c (piston fork) for pivotally holding the bogie beam 2 at a central point along the bogie beam. The attachment portion 1c has a base portion 7 usually in the form of a lug which protrudes below the bogie beam 2 when the landing gear is deployed, such that a horizontal line extending through the base portion 7 when the aircraft is on the ground would pass vertically below the axes of the wheels 4, 6.

A first brake rod 8, the rear brake rod, which is connected to the base portion 7 of the piston's attachment portion 1c, extends horizontally from the base portion 7 towards the rear wheel 6 and is for reacting torque in the rear braking assembly (shown in dotted line) during braking. When braking occurs the brake rod 8 will experience a tensile force since the torque resulting from the braking (an anticlockwise torque on the rear brake assembly of FIG. 1) is reacted into the base portion 7 via the brake rod 8 inducing tension in an axial direction of the rear brake rod 8.

A second brake rod 9, the forward brake rod, which is connected to the base portion 7 extends diagonally upwards from the base portion 7 towards the forward wheel 4 and is for reacting torque in the forward braking assembly (shown in dotted line) during braking. When braking occurs the forward brake rod 9 will experience a tensile force since the torque resulting from the braking (an anticlockwise torque on the forward brake assembly of FIG. 1) is reacted into the base portion 7 via the forward brake rod 9 inducing tension in an axial direction of the forward brake rod 9.

As can be seen in FIG. 1, the brake rods 8, 9 are attached at one end to the respective brake assemblies, and at the other to the attachment portion 1c, and in particular for the FIG. 1 embodiment, to a base portion 7 of the piston 1b. Thus these other ends of the brake rods 8, 9 are not attached to the bogie beam 2 but are instead connected directly to a lower end of the piston 1b, in particular the attachment portion 1c for the bogie beam 2, the piston fork, which is designed to carry significant loads already. Accordingly, the tensile forces carried by the brake rods 8, 9 are transmitted to this lower end of the shock strut 1 directly.

The connection positions of the first and second brake rods 8, 9 may be on a rear facing surface and a forward facing surface of the attachment portion 1c, so that the tensile forces pull on a surface of the piston 1b closest to the respective wheel 4, 6. The forward/rear facing surface may define a lug to which the brake rod 8, 9, 10 connects.

The connection positions of the first and second brake rods 8, 9 may be viewed as being on a rear portion of a side-facing surface (with reference to the direction of travel) and a forward portion of a side-facing surface (with reference to the direction of travel) of the attachment portion 1c, so that the tensile forces pull on a portion of the piston 1b closer to the respective brake assembly and wheel 4, 6. The forward/rear portions of the side-facing surface(s) may define a lug to which the brake rod 8, 9, 10 connects.

The piston 1b, or at least the attachment portion 1c thereof, may be formed of a strong, load bearing metal, such as steel, titanium or aluminium, which can readily resist the applied loads without failure.

By arranging the forward brake rod 9 to primarily react tensile loads, e.g., by ensuring the forward brake-rod-to-brake connection is above the axle axis of the forward wheel 4 (ideally at or around the 12 o'clock position, as opposed to the 6 o'clock position traditionally), the forward brake rod 9 can be optimized to take full advantage of the yield strength of the forward brake rod 9, as opposed to sizing the forward brake rod 9 for column buckling which is the case now. This is particularly appropriate for non-metallic material systems such as advanced composites where the strength of currently available intermediate modulus fibres may be approximately 30-45% stronger and 10% stiffer in tension (as compared to compression).

Figure 2:
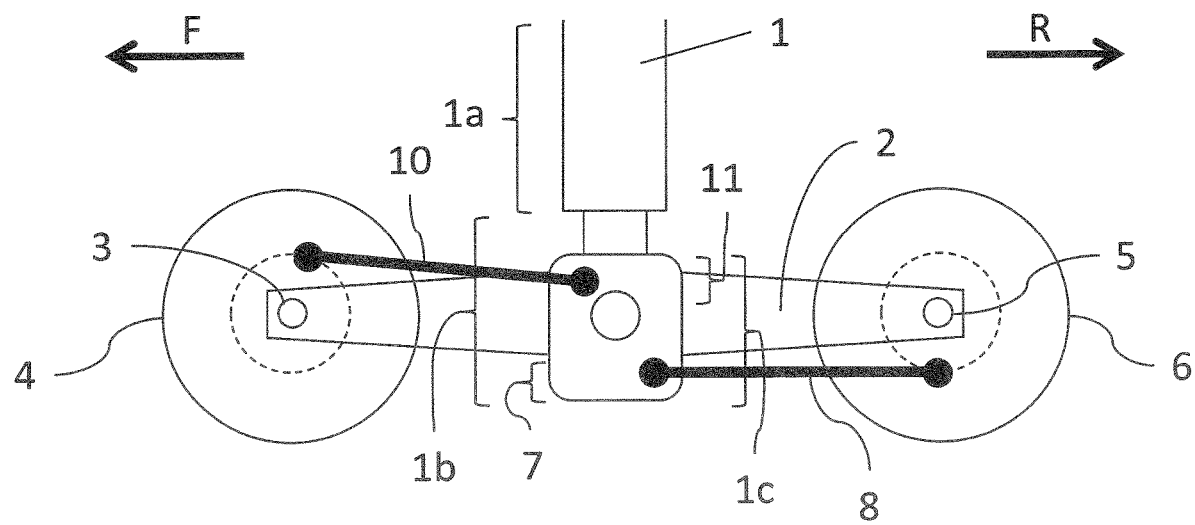
FIG. 2 shows an arrangement for aircraft main landing gear according to a second embodiment of the present disclosure.

Thus there is additional synergy with incorporating fibre composite brake rods in the new arrangements, e.g., as shown in FIGS. 1 and 2. It allows the brake rods (particularly the forward brake rods, which now primarily react tensile loads) to be sized for tensile loads rather than compressive loads, which in turn can result in significant weight savings compared to the current conventional configurations.

According to a second embodiment of the disclosure as shown in FIG. 2, the arrangement of the main landing gear is the same as in FIG. 1 except for the connection position of the forward brake rod and so like reference numbers will not be described again here.

In the second embodiment, the second brake rod 10, i.e., the forward brake rod, is connected higher up the attachment portion 1c, e.g., to an upper portion 11 at a position above the base portion 7 when the landing gear is deployed. A horizontal line passing through the point of connection would pass through or above the axes of the wheels 4, 6. From there, the second brake rod 10 extends towards the forward wheel 4, at an inclined angle which is less steep than the angle of the second brake rod 9 of the first embodiment. Depending on the relative connection heights on the forward brake assembly and the upper portion 11, the second brake rod 10 may be upwardly inclined towards the forward brake assembly as shown, may be generally level, or may slope slightly downwardly.

When braking occurs the second brake rod 10 will experience a tensile force since the torque resulting from the braking (an anticlockwise torque on the forward brake assembly of FIG. 2) is reacted into the upper portion 11 via the forward brake rod 10 inducing tension in an axial direction of the forward brake rod 10.

Thus in these embodiments, both the first and second brake rods 8, 9, 10 experience tensile forces under braking conditions. Accordingly, they can be made more slender without the previous concern for column buckling since the significant compressive loads on the forward brake rod 9, 10 during braking are no longer seen.

Further, in the second embodiment, the second brake rod 10 can be made shorter than the second brake rod 9 of the first embodiment for the same wheel spacing. Accordingly, the second embodiment can provide greater material and weight savings than the first embodiment.

In both arrangements, the connections to the piston can be on a rear facing surface and a forward facing surface respectively for the first and second brake rods, in order to deliver the tensile loads to these portions of the shock strut directly while also allowing the brake rods to be made as short as possible.

Further, in both arrangements, the connections to the piston can be viewed as being on a rear portion and a forward portion of a side-facing surface (with reference to the direction of travel) of the attachment portion 1c respectively for the first and second brake rods, in order to deliver the tensile loads to these portions of the shock strut directly while also allowing the brake rods to be shorter.

Figure 3:
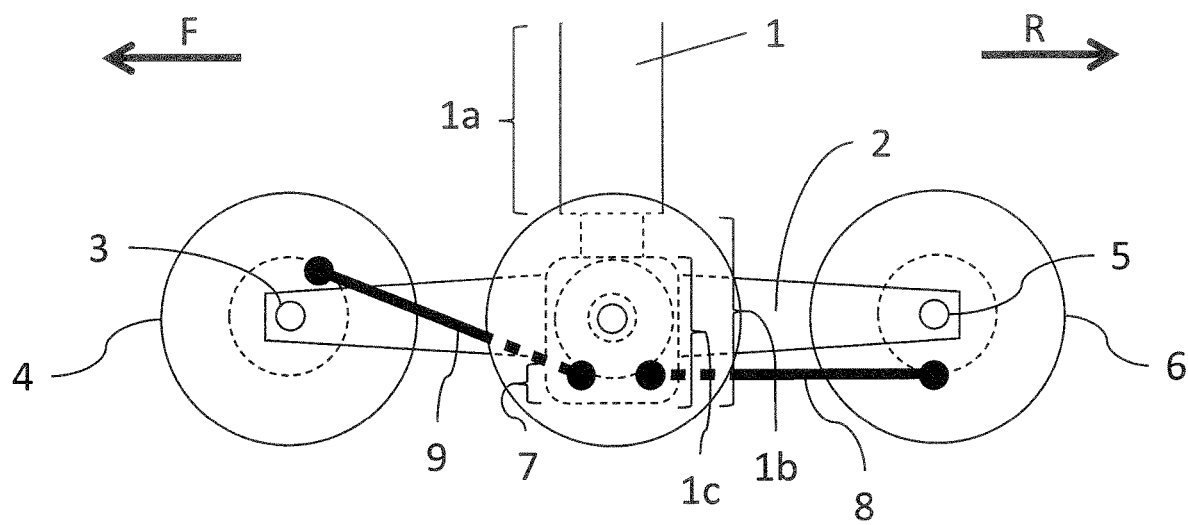
FIG. 3 shows an arrangement for aircraft main landing gear according to a third embodiment of the present disclosure.
Figure 4:
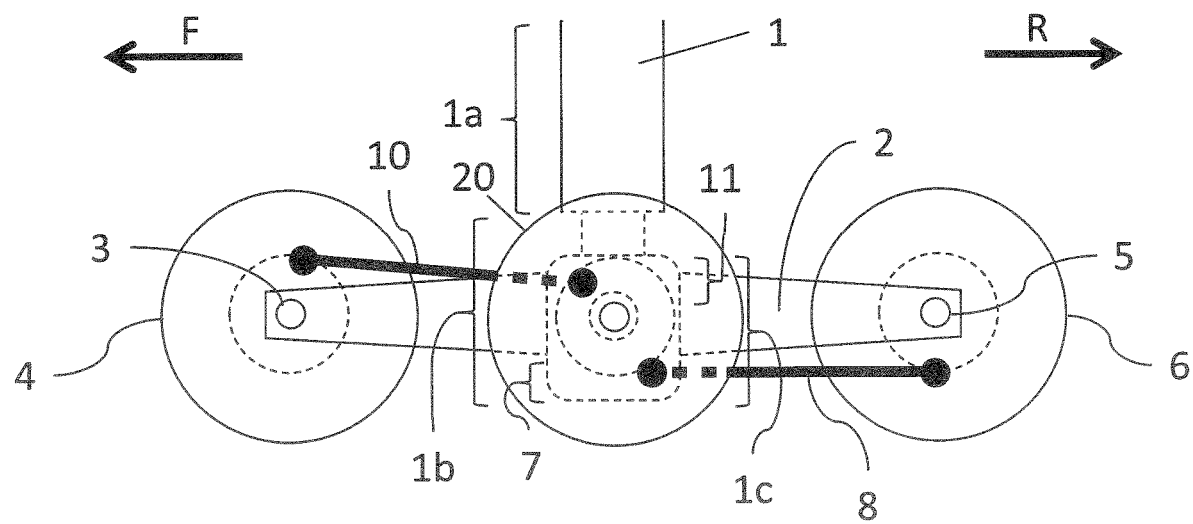
FIG. 4 shows an arrangement for aircraft main landing gear according to a fourth embodiment of the present disclosure.

As can be seen in FIGS. 3 and 4, alternative arrangements are envisioned wherein the bogie comprises three wheels (or six wheels if arranged in pairs). In this case, the central torque assembly for the central wheel 20 can be mounted directly on the attachment portion 1c. Accordingly, the braking torque from the central wheel 20 may be directly reacted by the piston 1b of the shock strut 1, without the need for a connecting brake rod.

Any weight savings in aircraft can lead to improved fuel efficiency. Thus the weight savings which can be achieved through using fibre composite brake rods in combination with configurations where the forward brake rod is primarily reacting tensile loads, can result in significant fuel savings.

In any of the above-described embodiments, the composite brake rods may be designed to have a lay-up where a significant proportion of the fibres (e.g., more than 40% of the fibres) are placed having an axial orientation. By "axial orientation", what is meant herein is having an angle of within ±25° of an axial direction of the rod. For example, the fibres may be wound such that they follow a helical path which generally extends in an axial direction, e.g., between 5 and 25 degrees to the axis of the brake rod, and in most cases between 8 and 15 degrees. For example, the axially orientated fibres may be orientated at an angle of about 10 degrees to the axial direction of the brake rod. Although truly axial fibres will carry axial tensile loads best and are envisaged as a possible solution, it is generally easier from manufacturing considerations to rotate a mandrel (with the lay-up) relative to a fibre source than to rotate the fibre source relative to the mandrel/lay-up, resulting in the axially orientated fibres following an inclined path of a helix as they extend from one end of the rod to the other. The lay-up may also include fibres arranged in various non-axial directions (e.g., ±26-90°), for example, to provide hoop strength and other reinforcement against buckling and/or other applied loads, to ensure a robust brake rod.

The fibre used in the fibre composite material may consist of carbon fibre.

While the new landing gear arrangement has been described as having a particular arrangement with respect to the figures, the present disclosure can be further modified, as will be understood to one skilled in the art, within the scope of the present disclosure as defined in the claims.

According to another aspect of the disclosure, there is provided an aircraft landing gear comprising forward and rear brake rods, wherein the forward and rear brake rods are connected to forward and rear brake assemblies such that they act in tension under braking conditions, and wherein the forward brake rod at least comprises fibre composite materials.

All optional features of the previously described aspects apply equally to this aspect. Accordingly, the front brake rod may comprise fibres placed with an axial orientation (within ±25° of the axial direction), the axially orientated fibres may be present in an amount exceeding 40%, optionally greater than 50%, and the fibres may consist of carbon fibres. Similarly the rear brake rod may also exhibit these features. The front brake rod may connect to an attachment portion of a piston forward of a bogie beam pivot, and the rear brake rod may connect to the attachment portion aft of the bogie beam pivot.

Further embodiments of the disclosure will now be described according to the following numbered clauses.

In various embodiments, an arrangement for aircraft landing gear is provided comprising forward and rear wheels having axles; forward and rear torque brake assemblies for the forward and rear wheels; a bogie beam connecting the forward and rear wheels; a shock strut comprising a piston connected to a central portion of the bogie beam, the piston comprising a bogie beam attachment portion having a base portion which protrudes below the bogie beam when the landing gear is deployed; and first and second brake rods, wherein the first brake rod extends horizontally from the base portion of the bogie beam attachment portion of the piston towards the rear wheel, to connect to the rear torque brake assembly at a position below the axle of the wheel, and wherein the second brake rod extends from the bogie beam attachment portion of the piston towards the forward wheel, to connect to the forward torque brake assembly at a position above the axle of the wheel.

In various embodiments, the second brake rod extends diagonally upwards from bogie beam attachment portion of the piston to the forward torque brake assembly.

In various embodiments, the second brake rod is connected to the bogie beam attachment portion of the piston at a position above the base portion and wherein the second brake rod extends diagonally across from the bogie beam attachment portion of the piston to the forward wheel. In various embodiments, the brake rods are formed of a composite material.

In various embodiments, a method of designing an aircraft landing gear arrangement is disclosed, comprising configuring an arrangement of brake rods where: a forward end of a forward brake rod connects to an upper portion of a forward brake assembly and a rear end of the forward brake rod connects to a bogie beam attachment portion of a piston; and a rear end of a rear brake rod connects to a lower portion of a rear brake assembly and a forward end of the rear brake rod connects to the bogie beam attachment portion of the piston; determining a maximum braking load to be applied to the forward and rear brake rods in tension; and selecting a fibre lay-up comprising axially orientated fibres (within ±25° of an axial direction) to meet the determined tensile requirements.

In various embodiments, the forward brake rod is not designed to carry compressive braking loads during landing. In various embodiments, the method further comprises designing the brake rod to further comprise additional non-axial fibres necessary for the structural integrity of the brake rod.

The invention claimed is:

1. An arrangement for landing gear comprising:
   a piston having an attachment portion with a pivot connection;
   a bogie beam mounted to the attachment portion at the pivot connection, the bogie beam supporting forward and rear brake assemblies on forward and rear sides of the piston respectively;
   a forward brake rod connected to the forward brake assembly at a location for acting under tension during braking; and
   a rear brake rod connected to the rear brake assembly at a location for acting under tension during braking;
   wherein a rear end of the forward brake rod is connected to the attachment portion forward of the pivot connection of the bogie beam, and a forward end of the rear brake rod is connected to the attachment portion, at a position rearward of the pivot connection,
   wherein at least one of the forward brake rod and the rear brake rod has been formed of a fibre composite material comprising fibres placed with an axial orientation, within ±25° of an axial direction of the at least one of the forward brake rod and the rear brake rod, and wherein the axially orientated fibres follow a helical path inclined at an angle of 5° or more to the axial direction.

2. The arrangement for landing gear of claim 1, wherein the forward brake rod connects to the forward brake assembly at a position above an axis of rotation for the forward brake assembly.

3. The arrangement for landing gear of claim 2, wherein the forward brake rod connects to the forward brake assembly at a position substantially at the top of the forward brake assembly within ±45° of an axis extending vertically from the axis of rotation for the forward brake assembly.

4. The arrangement for landing gear of claim 3, wherein the forward brake rod connects to the forward brake assembly at a position substantially at the top of the forward brake assembly within ±15° of the axis extending vertically from the axis of rotation for the forward brake assembly.

5. The arrangement for landing gear of claim 1, wherein the rear brake rod connects to the rear brake assembly at a position below an axis of rotation for a rear brake assembly.

6. The arrangement for landing gear of claim 5, wherein the rear brake rod connects to the rear brake assembly at a position substantially at the bottom of the rear brake assembly within ±45° of an axis extending vertically from the axis of rotation for the rear brake assembly.

7. The arrangement for landing gear of claim 6, wherein the rear brake rod connects to the rear brake assembly at a position substantially at the bottom of the rear brake assembly within ±15° of the axis extending vertically from the axis of rotation for the rear brake assembly.

8. The arrangement for landing gear of claim 1, wherein the forward brake rod and the rear brake rod connect to a base portion of the attachment portion protruding below the bogie beam.

9. The arrangement for landing gear of claim 1, wherein the forward brake rod connects to an upper portion of the attachment portion and the rear brake rod connects to a base portion of the attachment portion.

10. The arrangement for landing gear of claim 1, wherein the forward brake rod connects to a forward facing surface of the attachment portion and the rear brake rod connects to a rear facing surface of the attachment portion.

11. The arrangement for landing gear of claim 10, wherein the brake rods connect to lugs on the attachment portion.

12. A method of reacting torque from forward and rear brake assemblies on a landing gear bogie beam via forward and rear brake rods, the method comprising:

reacting torque from the braking assemblies as tension along the forward and rear brake rods into an attachment portion of a piston, the attachment portion having a pivot connection for mounting the bogie beam which supports the brake assemblies;

wherein a rear end of the forward brake rod reacts the torque from the forward brake assembly into the attachment portion forward of the pivot connection with the bogie beam as a tensile force under braking conditions, and a forward end of the rear brake rod reacts the torque from the rear brake assembly into the attachment portion at a position to a rear of the pivot connection as a tensile force under braking conditions, wherein at least one of the forward brake rod and the rear brake rod has been formed of a fibre composite material comprising fibres placed with an axial orientation, within ±25° of an axial direction of the at least one of the forward brake rod and the rear brake rod, and wherein the axially orientated fibres follow a helical path inclined at an angle of 5° or more to the axial direction.

13. The method of reacting torque of claim 12, wherein the method further comprises connecting a forward end of the forward brake rod to the forward brake assembly at a position above an axis of rotation for the forward brake assembly, and connecting a rear end of the forward brake rod to the attachment portion at a position above the pivot connection for the bogie beam.

* * * * *